United States Patent [19]

Smith

[11] 4,034,412
[45] July 5, 1977

[54] MAGNETIC TRANSDUCER APPARATUS WITH DAMPED SPRING ACTION

[75] Inventor: Curtiss A. Smith, El Cajon, Calif.
[73] Assignee: Davis-Smith Corporation, San Diego, Calif.
[22] Filed: Jan. 19, 1971
[21] Appl. No.: 107,797
[52] U.S. Cl. .............................................. 360/103
[51] Int. Cl.² ..................... G11B 5/60; G11B 17/34
[58] Field of Search ........... 179/100.2 P, 100.2 CA; 360/103; 267/158–160; 340/174.1 E

[56] References Cited

UNITED STATES PATENTS

| | | | |
|---|---|---|---|
| 2,961,494 | 11/1960 | Darou, Jr. et al. | 340/174.1 E |
| 3,177,495 | 4/1965 | Felts | 340/174.1 E |
| 3,202,772 | 8/1965 | Thomas, Jr. et al. | 179/100.2 P |
| 3,308,450 | 3/1967 | Bourdon et al. | 340/174.1 E |
| 3,349,384 | 10/1967 | Kohn | 340/174.1 E |
| 3,599,193 | 8/1971 | Cote et al. | 340/174.1 E |
| 3,634,837 | 11/1972 | Ridgway | 360/103 |

OTHER PUBLICATIONS

IBM Technical Disclosure Bulletin, vol. 4, No. 3, Aug. 1961.

*Primary Examiner*—Raymond F. Cardillo, Jr.
*Attorney, Agent, or Firm*—Brown & Martin

[57] ABSTRACT

A magnetic transducer unit for use in conjunction with a moving magnetic recording surface such as a magnetic disc. The unit includes a magnetic recording head mounted on an elongated spring for limited movement relative to a frame. The transducer is biased towards the recording surface by an adjustable loading spring which transmits its bias through a frictional damper. The frame is configured for ease of construction and assembly, is adaptable to varied mountings, and permits maximum spring length is minimum space.

13 Claims, 6 Drawing Figures

INVENTOR.
CURTISS A. SMITH
BY Brown & Martin
ATTORNEYS

MAGNETIC TRANSDUCER APPARATUS WITH DAMPED SPRING ACTION

BACKGROUND OF THE INVENTION

The demands of computer and recording technology for high speed, fast access recording devices has spurred the development of disc type recording devices. In these devices, the magnetic material is embedded in the surface of a disc shaped plate which is then rotated at high speed. One or more recording heads may operate in proximity to the upper and/or lower surface of the disc. The discs are manufactured to high tolerances but nevertheless have sufficient surface roughness to entrap a considerable film of air which then moves with the surface of the disc. Conventional recording heads have been designed to ride on this thin film of air, supporting the delicate transducer a small fraction of an inch away from contact with the disc. Thus, while the head "flys" about the surface of the disc, there is no wear on the head or associated parts. However, if the head is allowed to "fly" too high above the disc surface, poor frequency response and data resolution will be obtained and it is therefore necessary to bias the head toward the surface of the disc to keep the height to a minimum.

As described above, the normal operational situation is essentially non-wearing, however, there are two situations which are difficult to avoid in practice, that may cause severe damage and provoke eventual failure in conventional heads. The first situation results from the variations in surface roughness from one manufacturer to another, or even among different discs from the same manufacturer. This differentiation in surface roughness creates a differentiation in the depth of the laminar film pulled along by the rotating discs and therefore causes a variation in the flying height of the recording head. Consequently, a bias toward the disc surface that produces a proper flying height in one manufacturers disc, may force the head so close to the disc surface of another manufacturer that the head will strike asperities on the surface of the disc. The second situation is that the heads may be damaged by contact with the disc surface caused by vertical oscillations induced in the transducer head, by vertical variations in the disc surface. These variations are present in the discs of all manufacturers to a greater or lesser extent and causes the transmittal of a vertical force to the recording head by the action of the laminar film layer. The vertical variation may eventually induce an oscillation in the head of increasing amplitude until the amplitude is such that it causes a striking contact with the surface of the disc and consequential head damage.

Prior art devices make no provision for accommodation of the transducer apparatus to a range of surface roughness. Further they have no provision to obviate the tendency toward oscillation. In fact, a conventional design is arranged with point contact between the head support means and the biasing means thus allowing any tendency toward amplifying oscillation to proceed without interference.

The frame design of some prior devices required complex machining and other manufacturing operations resulting in high cost. Additionally, there is usually no provision for making the device adaptable to different mountings, or to facilitate assembly with the other elements of the apparatus.

SUMMARY OF THE INVENTION

An exemplary embodiment of the magnetic transducer apparatus of the invention comprises a frame having a magnetic recording head unit mounted for limited vertical movement on the frame by a supporting spring comprising an elongated metallic spring member attached at one end to the frame and at the other to the recording unit. The recording unit is forced towards the disc surface by a bias means comprising a load spring configured in a similar manner to the supporting spring out of an elongated spring like member.

The frame is configured in a simplified design that is susceptible to forming by extrusion, stamping or machining. It consists of a generally horizontal portion having a depending flange. The flange includes provisions for mounting the load spring and the supporting spring spaced vertically from one another. The load spring is pressed within a slot and fixed by adhesive, resulting in a secure mounting that requires minimum assembly. The supporting spring is bonded to the vertical portion of the frame to provide a large area for bonding and to gain maximum free spring length in the minimum space. The frame may be mounted to the recording device by a removeable bracket or may be gang mounted with other transducers.

The contact between the load spring and support spring is through a damping means. This damping means comprises an area of contact between the load spring and the damping surface attached to the head unit or supporting spring. Vertical movement of the transducer unit caused by variations in the disc surface, produces a relative movement between the load spring and the damping surface. By incorporating a damping surface having a known co-efficient of friction, a predictable damping effect, due to the dissipation of energy by friction, can be anticipated. The greater the disc surface variations tending to cause oscillations in the transducer unit, the greater the frictional effect, and therefore the greater the damping. This damping will prevent the oscillations from amplifying and thereby preventing them from reaching an amplitude which could cause impact with the disc surface.

An adjustment is mounted on the frame and comprises in the instant embodiment a screw mounted so as to be engageable with the upper surface of the load spring. When the screw is displaced downwards an increasing bias is placed on the load spring, which bias will be transferred through the damping means to the magnetic transducer unit.

The parallel spring construction allows the damping means to be the same interface between the supporting spring and the loading spring which transmits the force of the loading spring to the transducer unit. Additionally, the location of the load spring makes possible the use of a simple adjusting screw for varying the bias that the load spring places on the transducer unit.

It is therefore an object of this invention to provide a new and improved magnetic transducer apparatus.

It is another object of this invention to provide a new and improved magnetic transducer apparatus with damped spring action.

It is another object of this invention to provide a new and improved transducer apparatus with a frame configured, for ease of construction and assembly, adaptability to various mountings and minimum size.

It is another object of this invention to provide a new and improved magnetic transducer apparatus that provides increased magnetic head life by reducing the impacts of the magnetic head with the recording surface.

It is another object of this invention to provide a new and improved magnetic transducer apparatus wherein the tendency to oscillations of the transducer unit is reduced.

It is another object of this invention to provide a new and improved magnetic transducer apparatus wherein the bias of the transducer unit toward the recording surface may be varied.

It is another object of this invention to provide a new and improved magnetic transducer apparatus which is simple in design and may be constructed at low cost.

It is another object of this invention to provide a new and improved magnetic transducer apparatus, the damping and variable biasing functions are accomplished with the utilization of a minimum number of parts.

Other objects and many advantages of this invention will become more apparent upon a reading of the following detailed description and an examination of the drawings wherein like reference numerals designate like parts throughout.

BRIEF DESCRIPTION OF THE DRAWING

Referring now to FIGS. 1 through 5, there is shown a magnetic transducer apparatus 10 including a frame 12. The frame is of a generally L-shaped configuration. It may be secured to a recording device by a removable mounting bracket 14. The bracket is secured to the frame by a plurality of screws 15 and includes a vertical slot 16 to permit vertical adjustment on the recording device. With the bracket removed, the frame has no protrusion on either edge and therefore may be gang mounted edge to edge with other transducers.

Figure 3:
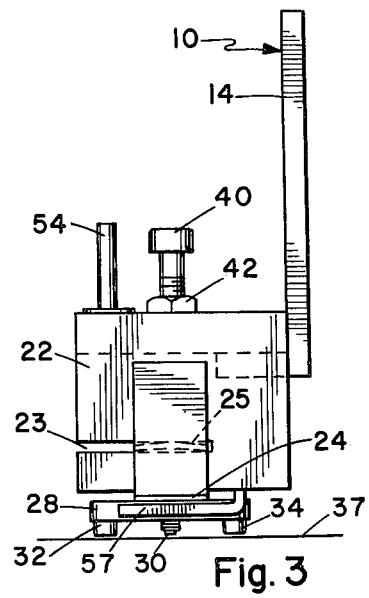
FIG. 3 is an end view as taken from the right hand end of FIG. 2.
Figure 4:
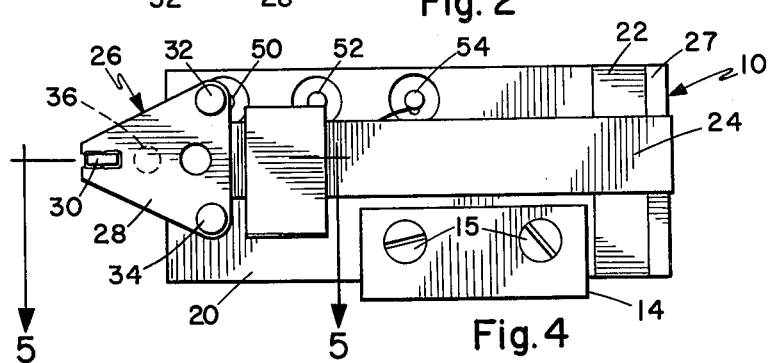
FIG. 4 is an underside view of the transducer apparatus of FIG. 1.

The vertically extending flange 22 of the frame provides for expedient mounting of the bias means and mounting means which in the instant embodiment comprises a load spring 25 and a supporting spring 24 respectively. These springs have an elongated configuration and it is desirable to mount them in such a way as to minimize the space required. Toward this end, the flange 22 has a longitudinally extending slot 23, spaced from the end 27 of flange 22. The slot extends beyond the center line of the flange so that the load spring may be centered when inserted. The slot is just larger than the spring in its flattened condition, however before insertion the spring is crimped so as to have a curved configuration when view from the end as in FIG. 3. Thus it must be flattened by forcibly pressing it within the slot and this creates a bias which holds the spring securely. The security of the spring is further assured by filling the slot with epoxy adhesive.

The flange also provides for the mounting of the supporting spring. The supporting spring has a vertical leg bent into it to mate with the vertical portion of the flange. In this manner an adequate area for bonding is obtained without wasting horizontal space. The bottom edge 27 of the flange is cut away so as to avoid interference with the movement of the spring and thereby increases its effective length.

The frame mounts an adjustment screw 40 and nut 42. The screw is mounted directly above the load spring so as to be engageable therewith. The utilization of the screw will be more fully described hereinafter.

The underside of the frame carries a C-shaped member 56 which has a lower leg 57 extending under the supporting spring 24. This member acts as a stop to prevent excessive vertical travel of the supporting spring when it is removed from the recording surface.

Spring 24 extends horizontally beyond frame 12 and has secured to its lower surface, near the end thereof, a magnetic recording head unit 26. The magnetic recording head unit includes a platform 28 carrying a magnetic core and coil 30 through a slot in its forward edge and two supporting pads 32 and 34 at its rear edge. Also mounted on platform 28, on the upper surface thereof, is a sapphire 36 which has an upper damping surface 38. The platform is generally triangular in configuration and has a pad or coil protruding approximately equal distance from the lower surface at each corner thereof. Thus with the magnetic disc surface 37 at rest, the head unit would be supported on the surface by the pads 32 and 34 and the core 30. The head is biased into contact with the surface by the action of supporting spring 24 together with the bias provided through load spring 25. The total bias resulting from these two springs is sufficient to maintain the head in contact with the non-moving surface 37, even with the unit installed in the inverted position, as would be the case with the unit being employed on the underside of the disc. In this static position, the bias for proper operation is found generally to be between three and twelve grams, and may be adjusted to this value through the use of adjusting screw 40 with its associated nut 42. Thus if the spring bias is found to be insufficiently high, either through the use of a spring balance or alternative by reference to the actual waveform response of the head, the adjusting screw 40 may be advanced so as to increase its pressure on the upper surface of spring 25 and force increased biasing of the spring through damping surface 38. When proper bias is achieved the position of screw 40 will be locked by tightening nut 42.

The electrical signals from or to head 30 are carried through wires 44, 46, and 48 and which terminate at connectors 50, 52 and 54. These connectors provide for easy connection between the electronics of the magnetic recording apparatus and the head unit.

Provision is made in the form of a vertical stop 56 for the lifting of the head unit 26. The vertical stop has the effect of preventing excessive vertical travel of the head unit when the entire transducer apparatus is lifted away from the disc surface. The stop is constructed of a C-shaped member secured to the underside of the frame and having a horizontal leg 57.

Figure 1:
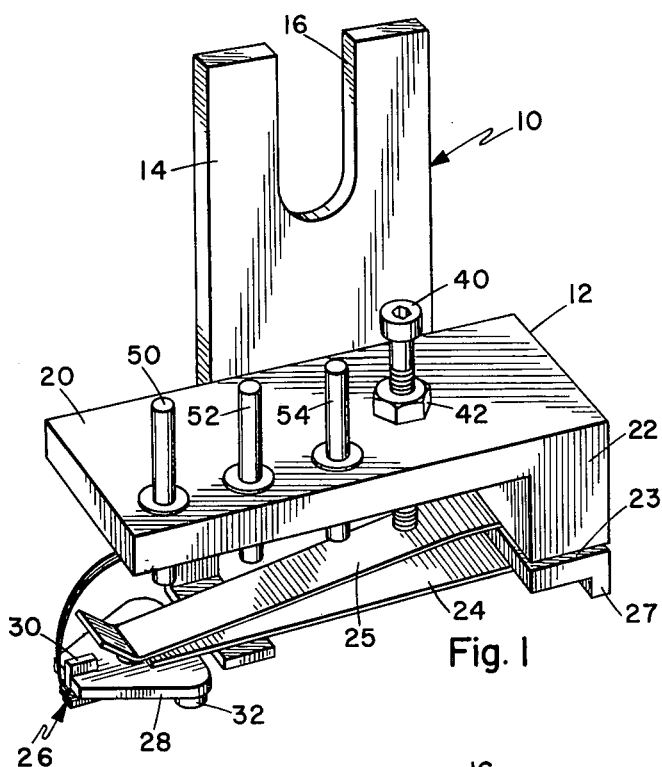
FIG. 1 is a perspective view of the complete transducer apparatus.
Figure 5:
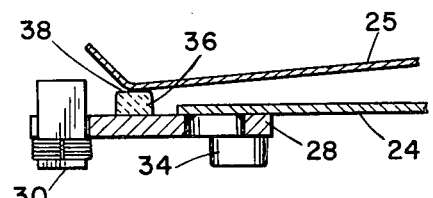
FIG. 5 is an enlarged sectional view taken on line 5—5 of FIG. 4.
Figure 6:
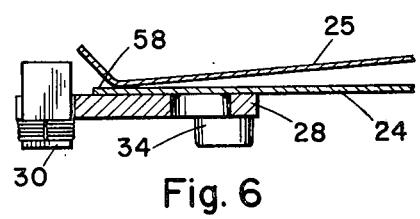
FIG. 6 is a sectional view similar to FIG. 5 showing an alternative damping arrangement.
Figure 2:
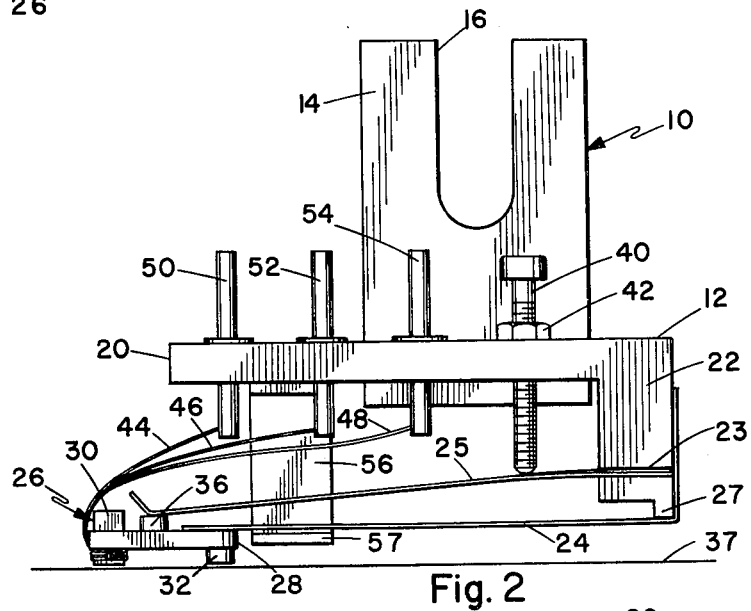
FIG. 2 is a side elevational view of the unit of FIG. 1.

Referring now to FIGS. 5 and 6 there is illustrated two forms of the damping means of the invention. The embodiment illustrated in FIG. 5 is that discussed in relation to the preferred embodiment of FIGS. 1 through 4 and utilizes a sapphire 36 to present a damping surface 38 which has a characteristic of long wear, uniformity and known surface roughness. The load spring 25 is bent in such a way as to contact the damping surface in a substantially tangential relationship. This results in a relatively large surface area being in contact with the damping means and therefore a relatively large amount of energy is dissipated by the relative movement between the load spring 25 and the supporting spring 24 as the head unit 26 is biased up and down by the vertical variations of the disc surface 37. The energy converted to heat form through the friction between the damping surfaces, is energy which is removed from the vertical oscillations and therefore the tendency toward larger vertical excursions is reversed and the oscillations reduced to a minimum value.

For purpose of description of the invention the damping effect has been discussed in relation to the oscillations induced by vertical variations, however it should be noted that a damping effect will also be produced by horizontal oscillations. These oscillations could be produced, for example, by horizontal indexing of the head across the disc surface. The damping results from relative movement of the upper and lower springs due to their difference in mass.

FIG. 6 shows an even simpler version of the frictional damper means of the invention. Here the load spring 25 is allowed to contact an extended portion 58 of the supporting spring 24. Again the configuration of spring 25 is selected so as to produce a nearly tangential relationship between the bottom surface of spring 25 and the damping surface 58. This results in a large area of contact between those two surfaces and therefore a large frictional damping tending to reduce the oscillations as in FIG. 5.

The overall construction and assembly of the magnetic transducer apparatus if highly simplified. A single piece frame is employed and is of a simple cross-section so as to be susceptible to many forming techniques. For example, extrusion may be employed to form the L-shaped configuration and the cut-away lower edge of flange 22 in one operation.

The spring 25 is mounted by pressing it within the slot 23 and assuring its securety with epoxy bonding. Similarly, the spring 24 may be secured with epoxy and will be securely held since an adequate area for bonding is provided. Adhesive bonding may also be used to secure the stop 56 to the underside of the frame.

The head structure is also simple in construction and utilizes a single platform secured, again by adhesive means, to the lower spring 24. The platform is provided with three points of support, one of those points of support being provided by the transducer cove itself, and contains the damping surface, which may be a sapphire as in FIG. 5 or merely an extension of the supporting spring as in FIG. 6.

In operation, the head structure will normally be resting on the magnetic surface 37 prior to start up of the disc recording apparatus. During initial rotation the head unit will ride in contact with the magnetic surface on the three supporting points 30, 32 and 34. When the surface reaches its operating speed, the head unit will actually be supported on a thin film of air which is entrapped by the surface roughness of the disc. The air moves with the disc surface. The thickness of the film will vary and is dependent in part, on the variations in surface roughness of various discs. If no adjustment were possible the head unit would ride at a different height above the magnetic surface depending on the surface roughness of the type of disc being employed. This variation in spacing between the magnetic coil 30 and the head surface would create a variation in the sensitivity and frequency response which would be experienced. With the practice of the invention however, it is merely necessary to compensate for variations in the film thickness with variations in the bias forcing the head unit toward the disc surface. This adjustment may be accomplished by setting the head bias to a predetermined value based on knowledge of a particular disc type roughness. It has been found that commonly employed discs require at least three grams of pressure to avoid instability in vertical oscillations of the head. Further, it has been determined, that a maximum of fourteen grams is required to achieve proper riding height for all known discs. Thus a pressure between three and fourteen grams will be selected based on experience with a particular disc type. The pressure will be produced by rotating the screw 40 until that reading is obtained on a spring balance or other force measuring means. Alternately, it is possible to adjust screw 40 by operating the head in its normal environment and comparing the existing frequency response to that response which should be produced with proper head spacing. Screw 40 is then rotated until the frequency response corresponding to the expected value is obtained.

With the proper riding height preset through the adjustment of screw 40, good results and negligible wear will be assured as long as the proper spacing of the head is maintained during operation. However, the heads position above the disc can be disturbed by variations in the disc surface as it rotates. To the extent they apply asymmetrical forces to the head unit, the head must be capable of following them. In the instant invention this capability is provided by supporting spring 24 being configured as an elongated leaf type spring. This configuration results in there being relatively little resistance of the unit to, for example, the pad 34 moving vertically somewhat more than pad 32. Therefore the head unit is able to follow such asymmetrical vertical variations quite readily.

The head unit must also be capable of following vertical excursions of the entire head unit forced by variations in the disc surface. The spring bias will produce a tendency for the head to return to the proper riding height, but without special provision, this may take place over too long a period of time, and further, might take place only after the head unit had impacted the surface of the disc. Due to the high disc speed this can easily damage or destroy the magnetic core 30. The damping means employed with the invention has the effect of removing energy from the spring system as it is forced to make vertical excursions. The greater the excursion forced, the greater the amount of energy which is removed by friction between the load spring 25 and the damping surface. The damping area provided by either the damping means in FIG. 5 or FIG. 6 has been found to be sufficient to reduce the induced vertical oscillations to an acceptable level, for all commonly experienced surface variations.

Having described my invention, I now claim:

1. In a magnetic transducer unit having a frame, and a magnetic recording head unit mounted for limited movement relative to said frame, wherein said head unit is to be supported a minimal distance away from a moving magnetic recording surface by the air carried along with said surface, said spacing to be substantially maintained despite irregularities in the movement of said surface that would otherwise tend to induce oscillation in said head unit, wherein the improvement comprises:

bias means including a loading spring, a supporting spring which cooperates with said bias means for supporting said head unit at said minimal distance, damping means for damping said oscillations of said head induced by said moving magnetic recording surface, said damping means comprising a substantial area of contact maintained during relative movement of substantially parallel surfaces on said loading spring and said head unit, whereby progressively increasing oscillations are eliminated to produce a head unit that closely follows said moving magnetic recording surface at a minimal spacing therefrom.

2. The magnetic transducer apparatus of claim 1 wherein:

said bias means is adjustable to vary the bias.

3. The magnetic transducer of claim 1 wherein:

said head unit is mounted on said frame by said supporting spring which is elongated and flexible.

4. The magnetic transducer unit of claim 3 wherein:

said loading spring is mounted on said frame and is elongated and flexible.

5. The magnetic transducer apparatus of claim 1 wherein:

said damping means comprises an area of contact between said loading spring and said supporting spring.

6. The magnetic transducer apparatus of claim 5 wherein:

an adjusting screw is mounted on said frame for adjustable engagement with said loading spring.

7. The magnetic transducer apparatus of claim 5 wherein:

said loading spring is mounted on said frame spaced vertically from said supporting spring, and said supporting spring and said loading spring being substantially parallel to one another and to the disc surface.

8. The magnetic transducer apparatus of claim 7 wherein:

said supporting spring is mounted on said frame by adhesive bonding, and said loading spring is mounted in a slot on said frame.

9. The magnetic transducer apparatus of claim 1 wherein:

said head unit includes a platform, said platform including a damping surface, and said loading spring biasing said head unit by contact with said damping surface.

10. The magnetic transducer apparatus of claim 9 wherein:

said damping surface is comprised of sapphire.

11. The magnetic transducer apparatus of claim 9 wherein:

said loading spring is mounted on said frame spaced vertically from said supporting spring, said supporting spring and said loading spring being substantially horizontal.

12. The magnetic transducer apparatus of claim 11 wherein:

said supporting spring is mounted on said frame by adhesive bonding, and said loading spring is mounted in a slot on said frame.

13. The magnetic transducer apparatus of claim 11 wherein:

an adjusting screw is mounted on said frame for adjustable engagement with said loading spring.

* * * * *